US 11,803,729 B2
United States Patent
Rouy (10) Patent No.: US 11,803,729 B2
(45) Date of Patent: Oct. 31, 2023

(54) SMARTCARD

(71) Applicant: STMicroelectronics (Rousset) SAS, Rousset (FR)

(72) Inventor: Olivier Rouy, Peynier (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 51 days.

(21) Appl. No.: 17/524,094

(22) Filed: Nov. 11, 2021

(65) Prior Publication Data

US 2022/0164620 A1 May 26, 2022

(30) Foreign Application Priority Data

Nov. 23, 2020 (FR) ...................................... 2012008

(51) Int. Cl.
| | |
|---|---|
| *G06K 19/077* | (2006.01) |
| *H05B 45/50* | (2022.01) |
| *H05B 45/32* | (2020.01) |
| *H05B 45/3725* | (2020.01) |
| *G06K 19/07* | (2006.01) |

(52) U.S. Cl.
CPC ... *G06K 19/07705* (2013.01); *G06K 19/0718* (2013.01); *G06K 19/0723* (2013.01); *H05B 45/32* (2020.01); *H05B 45/3725* (2020.01); *H05B 45/50* (2020.01)

(58) Field of Classification Search
CPC .......................... G06K 19/07005; H05B 45/50
USPC ....................................................... 235/492
See application file for complete search history.

(56) References Cited

U.S. PATENT DOCUMENTS

| | | | |
|---|---|---|---|
| 9,230,255 B1 | 1/2016 | Hanmer | |
| 11,206,727 B1* | 12/2021 | Palliyil Chundethodiyil | ............. H05B 45/34 |
| 2005/0194434 A1* | 9/2005 | Trent, Jr. | ............... G06K 19/07 235/492 |
| 2017/0357979 A1* | 12/2017 | Khurana | ............... H04L 63/102 |
| 2018/0014370 A1* | 1/2018 | Wang | ...................... G05F 1/461 |
| 2019/0156747 A1* | 5/2019 | Nie | ...................... G09G 3/3233 |
| 2019/0244210 A1 | 8/2019 | Cheng | |

(Continued)

FOREIGN PATENT DOCUMENTS

EP    3104669 A1    12/2016

OTHER PUBLICATIONS

INPI Search Report and Written Opinion for FR 2012008 (which is the FR priority filing for the instant US filing), dated Jul. 30, 2021 (9 pages).

*Primary Examiner* — Allyson N Trail (74) *Attorney, Agent, or Firm* — CROWE & DUNLEVY (57) ABSTRACT

A light-emitting diode has an anode terminal coupled to a node of application of a power supply voltage by a first transistor and a cathode terminal coupled to a node of application of a reference voltage by a second transistor. A microcontroller includes a digital-to-analog converter and a comparator, with the comparator having a first input coupled to one of the anode and cathode terminals of the diode and a second input configured to receive an output voltage of the converter. An output signal of the comparator controls one of the first and second transistors to turn off when the comparator detects an operating condition where current flow in the light-emitting diode exceeds maximum current limit (such as with the light-emitting diode operating in an exponential operating area.

35 Claims, 3 Drawing Sheets

(56) References Cited

U.S. PATENT DOCUMENTS

| | | | |
|---|---|---|---|
| 2020/0302857 A1* | 9/2020 | Hsiao | G09G 3/32 |
| 2020/0311509 A1* | 10/2020 | Benkley, III | G06F 21/32 |
| 2020/0388118 A1* | 12/2020 | Rosenberg | H02M 7/219 |

* cited by examiner

SMARTCARD

PRIORITY CLAIM

This application claims the priority benefit of French Application for Patent No. 2012008, filed on Nov. 23, 2020, the content of which is hereby incorporated by reference in its entirety to the maximum extent allowable by law.

TECHNICAL FIELD

The present disclosure generally concerns electronic devices and, more specifically, smart cards.

BACKGROUND

Many applications use smart cards, for example, payment cards, transport cards, personal identification cards, etc. Among current smart cards, cards equipped with a biometric sensor are particularly known. The biometric sensor typically enables to perform identity verifications, for example, for each use of the card.

There is a need for a smart card overcoming all or part of the disadvantages of known smart cards.

For example, there is a need for a smart card comprising a light-emitting diode (LED) where the electric power consumption of the LED is controlled.

SUMMARY

An embodiment overcomes all or part of the disadvantages of known smart cards.

For example, an embodiment provides a smart card comprising a light-emitting diode (LED), wherein the power consumption of the LED is controlled.

An embodiment provides a smart card comprising: a light-emitting diode having an anode terminal coupled to a node of application of a power supply voltage by a first transistor, and a cathode terminal coupled to a node of application of a reference voltage by a second transistor; and a microcontroller comprising a digital-to-analog converter and a comparator having a first input coupled to one of the anode and cathode terminals of the diode and a second input configured to receive an output voltage of the converter, wherein an output signal of the comparator controls one of the first and second transistors.

According to an embodiment, the output voltage of the converter is determined by a voltage that said one of the anode and cathode terminals would have if the diode was replaced with a resistor.

According to an embodiment, a resistance of said resistor is determined by a maximum value of the power supply voltage and by a maximum targeted current in said diode.

According to an embodiment, said resistor is equal to an equivalent resistor of the diode when the power supply voltage is equal to the maximum value and the maximum targeted current flows through said diode.

According to an embodiment, the first input of the comparator is coupled to the anode terminal of the diode, the comparator being configured to turn off said one of the first and second transistors when an anode voltage of the diode is smaller than the output voltage of the converter.

According to an embodiment, the first input of the comparator is coupled to the cathode terminal of the diode, the comparator being configured to turn off said one of the first and second transistors when a cathode voltage of the diode is greater than the output voltage of the converter.

According to an embodiment, the microcontroller is configured to control the other one of said first and second transistors.

According to an embodiment, the microcontroller is configured to set the other one of said first and second transistors to the on state during a phase of emission of light pulses by the diode.

According to an embodiment, said one of the first and second transistors belongs to an output of the microcontroller, for example, of three-state output type.

According to an embodiment: the output signal of the comparator controls the first transistor, the on state of the first transistor being configured to pull said output to the voltage of the first node, or the output signal of the comparator controls the second transistor, the on state of the second transistor begin configured to pull said output to the voltage of the second node.

According to an embodiment, the other one of the first and second transistors belongs to another output of the microcontroller, for example, of three-state output type.

According to an embodiment: the output signal of the comparator controls the first transistor, the on state of the first transistor being configured to pull said output to the voltage of the first node and the on state of the second transistor being configured to pull said other output to the voltage of the second node, or the output signal of the comparator controls the second transistor, the on state of the second transistor being configured to pull said output to the voltage of the second node and the on state of the first transistor being configured to pull said other output to the voltage of the first node.

According to an embodiment, the smart card further comprises a biometric sensor coupled to the microcontroller.

According to an embodiment, the biometric sensor is a fingerprint sensor.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the usual functionalities of a smart card, such as for example, the communication with a card reader and the delivery of a supply power to the card by a card reader, have not been described, the described embodiments being compatible with the usual functionalities of a smart card.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front", "back", "top", "bottom", "left", "right", etc., or to relative positional qualifiers, such as the terms "above", "below", "upper", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
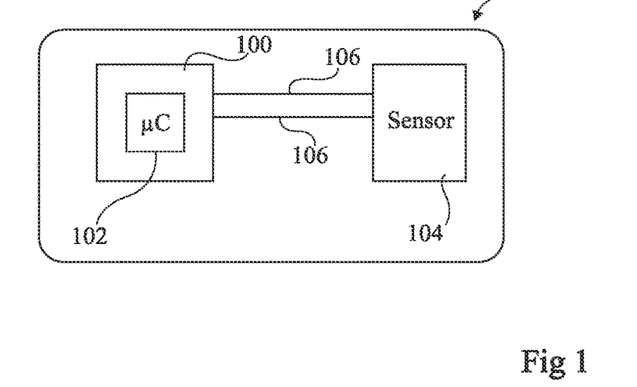
FIG. 1 very schematically shows, in the form of blocks, an example of a smart card of the type to which the described embodiments apply.

FIG. 1 very schematically shows, in the form of blocks, an example of a smart card 1 of the type to which the described embodiments apply.

Card 1 comprises a circuit 100, comprising a microcontroller 102 (block "µC"). Microcontroller 102 is, for example, configured to control one or a plurality of communication and/or power supply modules (not shown) of circuit 100. The module(s) of circuit 100 for example enable: operation to retromodulate an electromagnetic field emitted by a card reader and received by card 1, to transmit data to the reader; and/or operation to demodulate an electromagnetic field emitted by a reader and received by card 1, to receive data from the reader; and/or operation to exchange data with a card reader via electric signals transmitted between the reader and card 1 via at least one electric contact between the reader and card 1; and/or operation to generate a power supply voltage for circuits of card 1, from an electric supply power received from a card reader, either by electric contact with the reader, or via an electromagnetic field emitted by the reader. For example, circuit 100 comprises a power supply module configured to generate a voltage Vcc (not shown in FIG. 1) for powering microcontroller 102, from a received electric supply power.

Preferably, circuit 100, for example, its microcontroller 102, comprises a secure element (not shown) having data of identification of the holder of card 1 stored therein.

Circuit 100, for example, its microcontroller 102, comprises input and/or output terminals enabling to receive or to deliver electric signals from or to other elements of card 1.

In the example of FIG. 1, card 1 is a biometric card. Card 1 then comprises a biometric sensor 104 (block "Sensor"). Preferably, sensor 104 is a fingerprint sensor. However, the embodiments which will be described also apply to the case of a smart card comprising no biometric sensor.

Circuit 100, for example its microcontroller 102, is configured to exchange data with sensor 104. In the example of FIG. 1, electric conductors 106 connect circuit 100, for example, input and/or output terminals of microcontroller 102, to input and/or output terminals of sensor 104.

It would be desirable for card 1 to include an LED which is controlled by circuit 100 and, more particularly, by the microcontroller 102 of this circuit 100. Such an LED would for example enable to indicate the current step in a sequence of steps of an enrollment operation and/or to display the result of an operation implemented with card 1, such as for example a payment, a user identification, possibly by means of biometric parameters of this user, or an enrollment phase.

Figure 2:
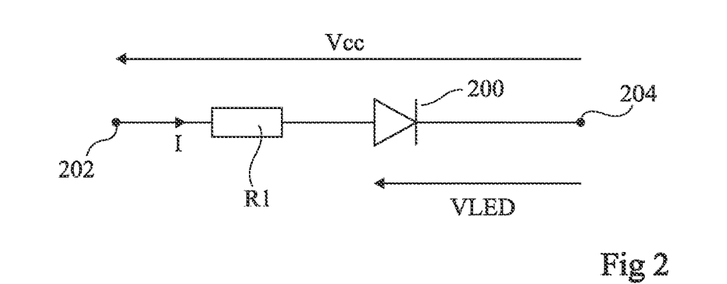
FIG. 2 shows an example of an electronic circuit comprising a light-emitting diode (LED)

FIG. 2 shows an example of an electronic circuit 2 comprising an LED.

This circuit 2 comprises at least one resistor R1 connected in series with an LED 200, between a node 202 and a node 204. The anode of LED 200 is coupled to node 202 and the cathode of LED 200 is coupled to node 204. More particularly, in the example of FIG. 2, resistor R1 couples the anode of LED 200 to node 202, and the cathode of LED 200 is connected to node 204.

In operation, a power supply voltage, for example, power supply voltage Vcc, is applied to node 202. Voltage Vcc is, for example, positive and referenced to a reference voltage applied to node 204. When voltage Vcc is sufficient for a voltage VLED across LED 200, referenced to the cathode of LED 200, to be greater than the turn-on threshold of LED 200, a positive current I flows from node 202 to node 204 and LED 200 emits light.

Figure 3:
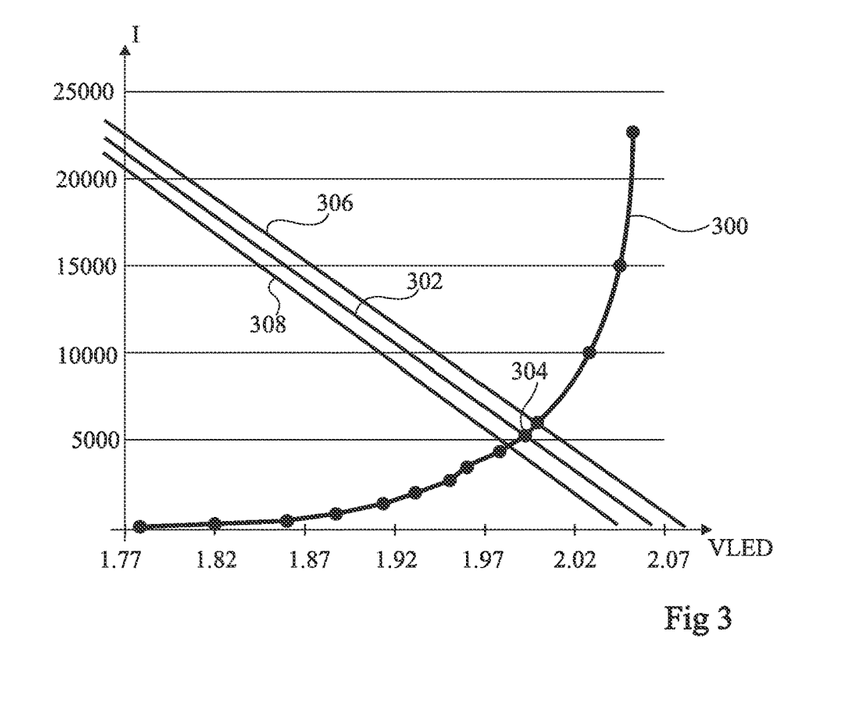
FIG. 3 illustrates with curves the operation of the circuit of FIG. 2.

FIG. 3 illustrates with curves the operation of the circuit of FIG. 2.

A curve 300 shows the variation of current I (in the ordinate and with units in µA) in LED 200 according to the voltage VLED (in the abscissa and with units in V) across LED 200.

A curve 302 shows the variation of current I in the circuit of FIG. 2, according to voltage VLED. More exactly, for the example of the circuit of FIG. 2, curve 302 corresponds to function I=(Vcc−VLED)/R1.

The intersection of curves 300 and 302 corresponds to the operating point 304 of the circuit of FIG. 2. In other words, when voltage Vcc is applied to node 202, the current I in the circuit is then equal to the current corresponding to operating point 304 and voltage VLED is then equal to the voltage VLED of operating point 304.

It could be devised to use the circuit of FIG. 2 in the card 1 of FIG. 1 so that card 1 comprises LED 200. For example, it could be devised to couple or connect the node 202 of the circuit of FIG. 2 to an output node of the microcontroller 102 of card 1, and node 204 to another output terminal of the microcontroller 102 of card 1. Microcontroller 102 would then be configured to apply the reference voltage to its output coupled to node 204, and to control a light emission by LED 200 by applying voltage Vcc onto its output coupled to node 202.

However, resistor R1 should then be provided in card 1, which poses bulk problems, and which complicates the manufacturing of card 1, particularly if it is necessary to provide a micro printed circuit board (micro-PCB) for resistor R1. More generally, the provision of resistor R1 in card 1 poses manufacturing problems in the case where card 1 is submitted to strong cost and dimension constraints.

Further, in the circuit of FIG. 2, to decrease the power consumption of LED 200 and for a nominal value of voltage Vcc, the resistance value of resistor R1 is determined so that operating point 304 corresponds to a relatively low current I, for example, in the order of from 1 to 2 mA.

However, voltage Vcc may vary with respect to its nominal value for which the resistance value of resistor R1 has been determined to obtain the desired operating point 304. For example, an increase in voltage Vcc with respect to its nominal value causes an upward offset of curve 302, as illustrated by curve 306 and, conversely, a decrease in voltage Vcc with respect to its nominal value causes a downward offset of curve 302, as illustrated by curve 308. This results in a modification of operating point 304, and thus of current I and of the power consumption of LED 200. In particular, when curve 302 displaces towards curve 306, operating point 304 displaces on curve 300 all the way to an area where the current I in LED 200 increases exponentially with the increase of voltage VLED. This then results in an excessive power consumption of LED 200, which is not desirable.

To decrease the amplitude of the offset of curve 302 towards curve 306 when voltage Vcc increases with respect to its nominal value, it could be devised to increase the resistance value of resistor R1. However, in order for operating point 304 not to be modified, this also implies increasing the nominal value of voltage Vcc, which is not desirable, or even cannot be possible in a smart card where voltage Vcc is generally at most in the order of 2.1 V, or even at most in the order of 1.8 V.

It has been observed that the current I in LED 200 increases with voltage VLED, first linearly, for example, up to the operating point 304 illustrated in FIG. 3, and then exponentially.

An embodiment provides monitoring the variation of the voltage across an LED, detecting when the current in the LED passes from a relatively linear increase with the voltage thereacross to an exponential increase with the voltage thereacross, and cutting off the LED power supply when the current in the LED increases exponentially with the voltage across the LED. By the stopping of the power supply of LED 200 when the current increases exponentially in the LED, the LED is prevented from consuming too much electric power. Thus, the LED power consumption, that is, the value of the current which flows through the LED, is controlled. In other words, an embodiment provides monitoring the variation of the voltage across the LED and cutting off the LED power supply when the current flowing therethrough reaches a desired maximum current in the LED. As an example, the current in the LED increases relatively linearly up to this maximum current, and then relatively exponentially after this maximum current, when the voltage VLED across the LED increases, for example, due to upward fluctuations of voltage Vcc with respect to its nominal value.

Figure 4:
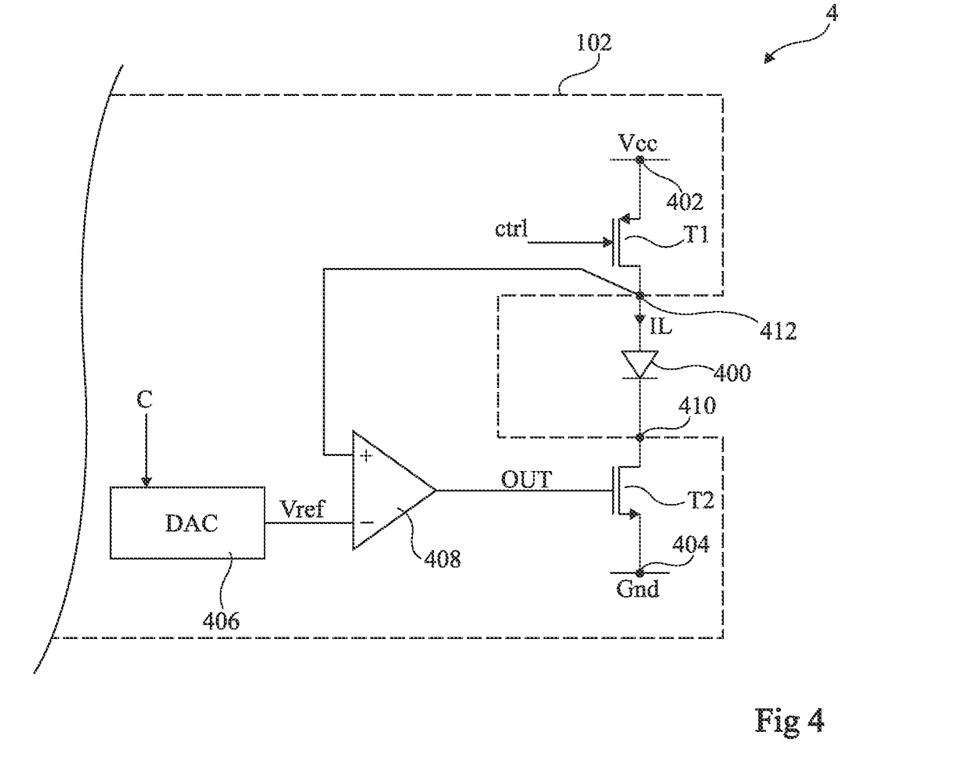
FIG. 4 schematically shows an embodiment of a smart card comprising the LED.

FIG. 4 schematically shows an embodiment of a smart card 4 comprising an LED. Card 4 is, for example, similar to card 1, with the difference that it further comprises an LED 400. In FIG. 4, only a portion of microcontroller 102 and the LED 400 of card 4 have been shown. LED 400 is, for example, identical to the LED 200 of FIG. 2.

LED 400 has an anode terminal coupled to a node 402 of application of voltage Vcc, and a cathode terminal coupled to a node 404 of application of a reference voltage, typically ground Gnd. Voltage Vcc is referenced to node 404.

More exactly, a Metal Oxide Semiconductor (MOS) transistor T1 couples the anode of LED 400 to node 402, and a MOS transistor T2 couples the cathode of LED 400 to node 404. Transistor T1 preferably has a P channel and, for example, has its source coupled, preferably connected, to node 402, and its drain coupled, preferably connected, to the anode of LED 400. Transistor T2 preferably has an N channel and, for example, has its source coupled, preferably connected, to node 404, and its drain coupled, preferably connected, to the cathode of LED 400.

Microcontroller 102 comprises a digital-to-analog converter 406 (block "DAC"). Converter 406 is configured to receive a digital code C, and to deliver an analog voltage Vref corresponding to this code C. Voltage Vref corresponds to a fraction of voltage Vcc. In other words, for a given code C, voltage Vref is equal to A times voltage Vcc, A being a factor smaller than 1 and determined by code C.

Microcontroller 102 further comprises a comparator 408. A first input of comparator 408 is coupled to one of the anode and cathode terminals of LED 400 and a second input of comparator 408 is configured to receive voltage Vref. Comparator 408 is configured to deliver an output signal OUT. Signal OUT is a binary signal. A first binary state of signal OUT indicates when the voltage on the first input of comparator 408 is greater than the voltage Vref on the second input, a second binary state of signal OUT indicating when the voltage on the first input is smaller than the voltage Vref on the second input.

One of the two transistors T1 and T2 is controlled by signal OUT.

The other one of the two transistors T1 and T2 is controlled by a binary signal ctrl delivered by microcontroller 102. Microcontroller 102 is configured to control, via signal ctrl, the setting to the on state of this transistor during a phase of light pulse emission by the LED.

More particularly, in the embodiment illustrated in FIG. 4, the first input of comparator 408 is coupled to the anode of LED 400 and the second input of comparator 408 receives voltage Vref. In this embodiment, signal OUT controls transistor T2 and signal ctrl controls transistor T1. The first input of comparator 408 then is the non-inverting input (+) and the second input of comparator 408 is the inverting input (−), so that comparator 408 controls, via its output signal OUT, a turning off (setting to the non-conductive state) of transistor T2 when the voltage on the anode of LED 400 becomes smaller than voltage Vref.

According to an embodiment, the transistor T1 or T2 controlled by signal OUT, that is, transistor T2 in the embodiment of FIG. 4, belongs to a three-state output 410 of microcontroller 102, for example, a three-state output of microcontroller 102. In other words, transistor T2 belongs to microcontroller 102. Transistor T2 is configured to force a level on output 410 when it is set to the on state, that is, in this embodiment, to pull output 410 to voltage Gnd of node 404. Transistor T2 is then connected between node 404 and output 410, and the cathode of LED 400 is coupled, preferably connected, to output 410.

According to an embodiment, the transistor T1 or T2 controlled by signal ctrl, that is, transistor T1 in the embodiment of FIG. 4, belongs to an output 412 of microcontroller 102, for example, a three-state output of microcontroller 102. In other words, transistor T1 belongs to microcontroller 102. Transistor T1 is configured to force a level on output 412 when it is set to the on state, that is, in this embodiment, to pull output 412 to the voltage Vcc of node 402. Transistor T1 is then connected between node 402 and output 412, and the anode of LED 400 is coupled, preferably connected, to output 412.

The combination of the two above embodiments enables for LED 400 alone to be arranged outside of microcontroller 102, which simplifies card 4 with respect to the case where one and/or the other of transistors T1 and T2 would be arranged outside of microcontroller 102. Indeed, advantage is here taken from the fact that transistors T1 and T2 are already present in the outputs 410 and 412 of microcontroller 102.

However, in alternative embodiments, not illustrated, one and/or the other of transistors T1 and T2 may be arranged outside of the microcontroller. In this case, the signal ctrl, respectively OUT, for controlling transistor T1, respectively T2, is delivered by a corresponding output of microcontroller 102.

In operation, when the two transistors T1 and T2 are on, a current IL flows through LED 400. If the voltage on the anode of LED 400 becomes smaller than voltage Vref, signal OUT switches and causes the setting to the off state of transistor T2. Current IL becomes zero, whereby the anode voltage of LED 400 becomes equal to Vcc and thus becomes greater again than voltage Vref. This causes a new switching of signal OUT, and thus the setting to the on state of transistor T2. The current IL in LED 400 increases until the anode voltage of LED 400 becomes smaller again than voltage Vref. This operation is repeated as long as the microcontroller keeps transistor T1 on, whereby LED 400 emits light pulses as long as transistor T1 is on.

Thus, for a given voltage value Vcc, the selection of voltage Vref conditions the maximum current IL capable of flowing through LED 400 before signal OUT switches and causes the turning off of the transistor that it controls, and LED 400 stops emitting.

The frequency of the light pulses emitted by LED 400 is partly determined by the response time of comparator 408. As an example, this frequency is in practice greater than or equal to 50 Hz, whereby the emission of light by LED 400 is perceived as continuous by a user.

An example of selection of voltage Vref, and thus of the code C supplied to converter 406, will now be described in relation with FIG. 5.

Figure 5:
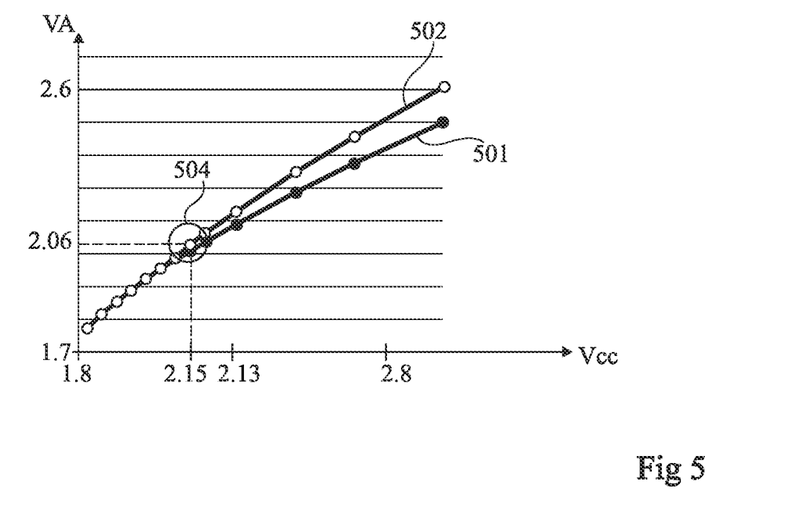
FIG. 5 illustrates with curves the operation of the smart card of FIG. 4.

FIG. 5 illustrates, with two curves 501 and 502, the variation of the anode voltage VA of the LED 400 of the card 4 of FIG. 4, according to the value of voltage Vcc.

More particularly, curve 501 illustrates the variation of voltage VA when LED 400 behaves as a conventional LED, that is, when the voltage VLED thereacross and the current IL flowing therethrough follow the curve 300 of FIG. 3, and curve 502 illustrates the variation of voltage VA when LED 400 is replaced with a resistor. The two curves 501 and 502 are obtained while transistors T1 and T2 are maintained on, for example, by applying voltage Vcc to the gate of transistor T2, and voltage Gnd to the gate of transistor T1.

The resistance used to obtain curve 502 corresponds in practice to the equivalent resistance of LED 400 when voltage Vcc is at its maximum value, for example, 2.1 V, so that a maximum targeted current Imax flows through LED 400, that is, between nodes 402 and 404 of FIG. 4. The maximum value of voltage Vcc, for example, corresponds to the maximum value that voltage Vcc can take due to unwanted variations of voltage Vcc around its nominal value.

For example, for a maximum value of voltage Vcc equal to 2.1 V, for on-state resistances of transistors T1 and T2 each equal to 40 ohms (neglecting the variations of the on-state resistances of transistors T1 and T2 with voltage Vcc), and targeting a current Imax in the LED in the order of 1 mA, that is, a current Imax still comprised in an area of curve 300 (FIG. 3) where the current in LED 400 increases substantially linearly with the voltage across LED 400, and not exponentially, the resistance used for curve 502 is in the order of 2 kilo ohms, for example, equal to 2.02 kilo ohms, which corresponds, for example, according to the specifications of the LED provider, to the equivalent resistance of the LED at its threshold voltage under a 1 mA current.

As can be seen in the curve 502 of FIG. 5, when the value of voltage Vcc increases and LED 400 is replaced with a resistor determined as indicated hereabove, voltage VA increases substantially proportionally with voltage Vcc. The fact for curve 502 not to be exactly a straight line is due to small variations of the on-state resistances of transistors T1 and T2 with voltage Vcc.

As can be seen in FIG. 5 inside of a circle 504, when voltage Vcc increases, there is a value of voltage Vcc from which curve 501 diverges from curve 502, the voltage VA for curve 501 then becoming smaller than the voltage VA for curve 502 for a given value of voltage Vcc.

The fact for curve 501 to diverge from curve 502 indicates that LED 400 is then equivalent to a resistor of smaller resistance than the resistance used for the plotting of curve 502, and thus that the current flowing through LED 400 is higher than that flowing through the resistor used for curve 502. In other words, this indicates that LED 400 has entered an area of its current-vs.-voltage characteristic where the current that it conducts increases exponentially with the voltage across LED 400. Still in other words, this indicates that LED 400 has left the area of its current-vs.-voltage characteristic where the current that it conducts increases substantially linearly with the voltage thereacross. This exponential operating area of LED 400 is precisely that which is desired to be avoided, to keep a relatively low current in LED 400, that is, to control the power consumption of LED 400.

Thus, by detecting with comparator 408 (FIG. 4) when the voltage VA of the anode of LED 400 becomes smaller than the value that it would have had if LED 400 was replaced with the resistor used for the plotting of curve 502, and by turning off transistor T2 when it happens, LED 400 is prevented from reaching its exponential operating area.

In the example of FIG. 5, curve 501 diverges from curve 502 from a voltage Vcc equal to 2.15 V, the voltage VA of curve 504 then being equal to 2.06 V, that is, to 2.06/2.15*Vcc or 0.95 Vcc. Thus, the code C supplied to converter 406 (FIG. 4) is such that converter 406 delivers voltage Vref equal to 0.95 Vcc. As a result, when voltage Vcc varies, voltage Vref also varies and substantially follows curve 502.

As a summary, to determine code C, the value of the resistance that LED 400 should have for current Imax to flow through LED 400 when voltage is at its maximum value is determined. The variation, according to value Vcc, of the anode voltage of LED 400 is plotted by using LED 400 for a first curve and the previously-determined resistance for a second curve. The ratio of voltage Vcc to voltage VA of the second curve when the first curve diverges from the second curve is determined. Code C is determined so that converter 406 delivers voltage Vref equal to voltage Vcc multiplied by the determined ratio, or slightly smaller, for example, by 1%, than voltage Vcc multiplied by the determined ratio to take into account the propagation time in comparator 408.

In other words, the value of the resistance that LED 400 should have for current Imax to flow through LED 400 when voltage Vcc is at its maximum value is determined, a first value of the voltage on node 412 is determined, and code C is determined so that voltage Vref, when voltage Vcc is at its maximum value, is equal to this first value, even to a value slightly smaller, for example, by 1%, than this first value to take into account the propagation time in comparator 408.

Still in other words, Vref, and thus code C, is determined so that the current in LED 400 remains smaller than current Imax, even when voltage Vcc is not at its nominal value, but at its maximum value, possibly taking into account the switching time of comparator 408.

A case where curve 502 is determined by replacing LED 400 with an equivalent resistor, to detect when curve 501 diverges form curve 502, has been described hereabove. It is also possible to obtain curve 502, or at least an approximation thereof, by plotting curve 501, and thus using as curve 502 the tangent to curve 501 in the portion of curve 501 which varies linearly with voltage Vcc.

More generally, it will be within the abilities of those skilled in the art to determine voltage Vref, and thus code C, so that the current in LED 400 remains smaller than a current Imax, even when voltage Vcc diverges from its nominal value and reaches its maximum value.

Figure 6:
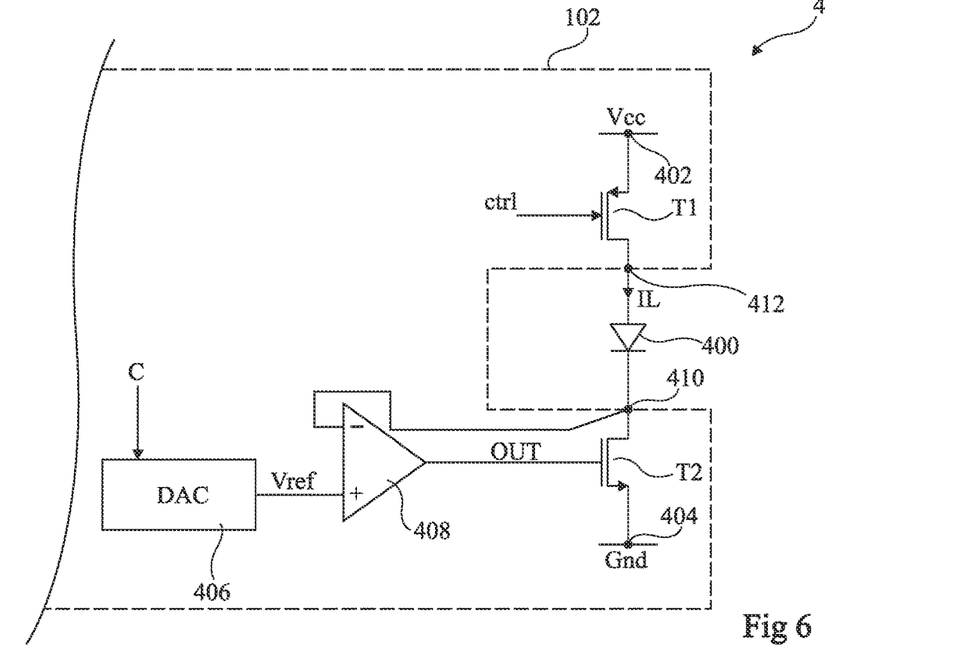
FIG. 6 schematically shows an alternative embodiment of the smart card of FIG. 4.

FIG. 6 schematically shows an alternative embodiment of the card 4 of FIG. 4, only the differences between the card 4 of FIG. 4 and that of FIG. 6 being here highlighted.

The card 4 of FIG. 6 differs from that of FIG. 4 in that one of the inputs of comparator 408 is here coupled to the cathode of LED 400 and not to the anode thereof as in FIG. 4.

More particularly, in this example where the output signal OUT of comparator 408 controls transistor T2, the inverting input of comparator 408 is coupled, preferably connected, to the cathode of LED 400, and the non-inverting input of comparator 408 receives voltage Vref.

Indeed, an embodiment where one of the inputs of comparator 408 is coupled to the anode of LED 400 has been described hereabove in relation with FIGS. 4 and 5. Similarly to what has been described, it is possible to limit the current IL in LED 400, even if voltage Vcc varies, by comparing the cathode voltage of LED 400 with the cathode voltage that LED 400 would have had if it had been replaced with the previously-mentioned resistor.

Thus, by determining, for a maximum value of voltage Vcc, the value of the equivalent resistance that LED 400 should have for current Imax to flow through LED 400 when voltage Vcc is at its maximum value, and then by plotting the variation, according to voltage Vcc, of the cathode voltage of LED 400 and of the cathode voltage of LED 400 replaced by this resistor, it can be observed that, based on a value of voltage Vcc, the curve of the cathode voltage of LED 400 diverges from the curve of the cathode voltage of LED 400 replaced with the resistor, becoming greater than the latter. The ratio of this value of voltage Vcc to the value of the cathode voltage of LED 400 replaced with the resistor can then be determined, and the code C to be supplied to converter 406 can thus be deduced therefrom. Of course, this code C will then be different from the code C obtained for the embodiment of FIG. 4.

Similarly to what has been indicated in relation with FIG. 5, it will be within the abilities of those skilled in the art to determine voltage Vref, and thus code C, so that the current in LED 400 remains smaller than current Imax, even when voltage Vcc diverges from its nominal value and reaches its maximum value. As previously, it will be within the abilities of those skilled in the art to determine this voltage Vref, and thus code C, preferably taking into account the switching time of comparator 408.

In operation, when the cathode voltage of LED 400 becomes greater than voltage Vref, signal OUT switches and causes the setting to the off state of transistor T2. In other words, conversely to FIG. 4 where comparator 408 is configured to turn off transistor T2 when the anode voltage of the LED becomes smaller than voltage Vref, the comparator 408 of FIG. 6 here is configured to turn off transistor T2 when the cathode voltage of LED 400 becomes greater than voltage Vref.

Figure 7:
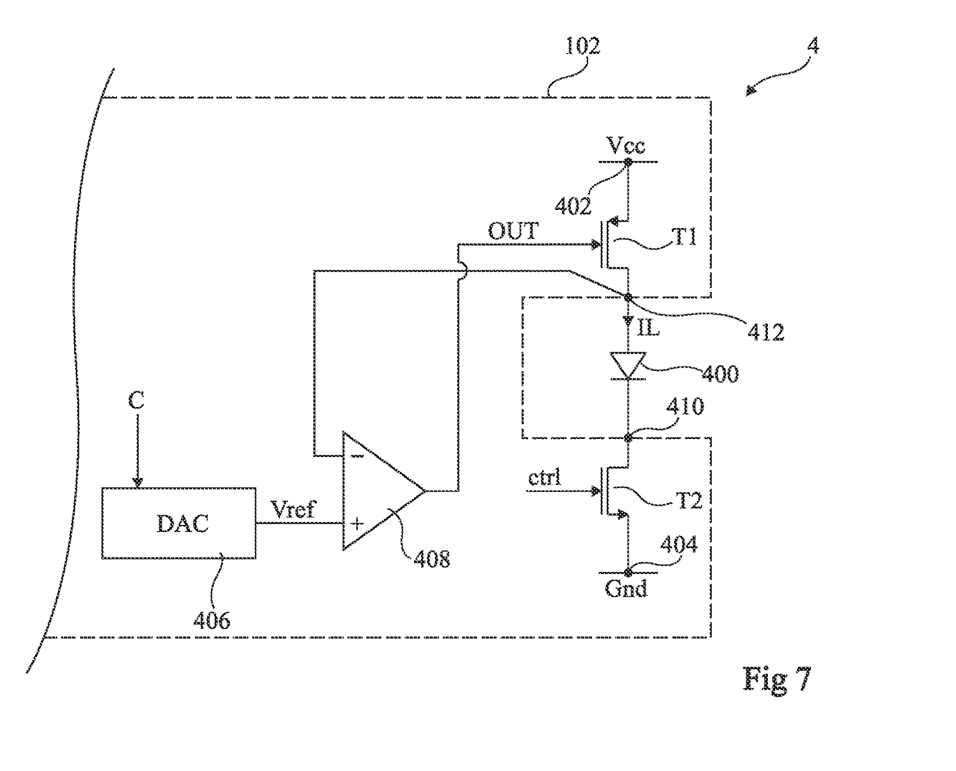
FIG. 7 schematically shows another alternative embodiment of the smart card of FIG. 4.

FIG. 7 illustrates another alternative embodiment of the card 4 of FIG. 4, only the differences between the card 4 of FIG. 4 and that of FIG. 7 being here highlighted.

The card 4 of FIG. 7 differs from that of FIG. 4 in that comparator 408 controls transistor T1 and not transistor T2 as was the case in FIG. 4. Further, in this alternative embodiment, transistor T2 is controlled by the signal ctrl delivered by microcontroller 102.

More exactly, similarly to what has been indicated in relation with FIG. 4, comparator 408 is configured to turn off the transistor T1 or T2 that it controls, that is, transistor T1 in FIG. 7, via its output signal OUT, when the anode voltage of LED 400 becomes smaller than voltage Vref. As an example, when transistor T1 is a P-channel transistor, the inverting input (−) of comparator 408 receives the anode voltage of LED 400 and the non-inverting input (+) of comparator 408 receives voltage Vref. Further, microcontroller 102 is configured to keep transistor T2 on during a phase of light pulse emission by LED 400.

The code C delivered to converter 406, and thus voltage Vref, or, in other words, the ratio of voltage Vcc to voltage Vref, are determined as described in relation with FIGS. 4 and 5. Particularly, the code C supplied to the converter 406 of FIG. 7 is identical to that supplied to the converter 406 of FIG. 4.

The operation of the transistor T1, respectively T2, of the card 4 of FIG. 7 is identical to that of the transistor T2, respectively T1, of the card 4 of FIG. 4.

In still another alternative embodiment, not illustrated and corresponding to the combination of the alternative embodiments of FIG. 6 and of FIG. 7, transistor T2 is controlled by the signal ctrl of microcontroller 102, transistor T1 is controlled by the output signal OUT of comparator 406, and comparator 406 has an input, preferably inverting, coupled, for example, connected, to the cathode of LED 400, and another input, preferably non-inverting, receiving voltage Vref. In this other variant, code C or, in other words, voltage Vref or the ratio of voltage Vref to voltage Vcc, are determined as described in relation with FIG. 6. For example, the code C supplied to the converter 406 of this alternative embodiment will be identical to that supplied to the converter 406 of the embodiment of FIG. 6. Further, comparator 408 is then configured to turn off switch T2 when the cathode voltage of LED 400 becomes greater than voltage Vref.

Although in FIG. 4, FIG. 6, and FIG. 7, card 4 is only partially shown, the microcontroller 102 of card 4 may, like that of the card 1 of FIG. 1, form part of circuit 100, and card 4 may comprise, like the card 1 of FIG. 1, sensor 104. When card 4 comprises sensor 104, the latter is coupled to circuit 100, and more particularly to its microcontroller 102, for example, directly with electric conductors, or via an additional microcontroller coupled both to microcontroller 102 and to sensor 104.

Various embodiments and variants have been described. Those skilled in the art will understand that certain features of these various embodiments and variants may be combined, and other variants will occur to those skilled in the art.

Finally, the practical implementation of the described embodiments and variations is within the abilities of those skilled in the art based on the functional indications given hereabove. In particular, the determination of code C, or, in other words, of voltage Vref or of the ratio of voltage Vcc to voltage Vref, is within the abilities of those skilled in the art based on the functional indications given hereabove.

The invention claimed is:
1. A smart card, comprising:
 a light-emitting diode having an anode terminal and a cathode terminal;
 a first transistor configured to couple the anode terminal to a node of application of a power supply voltage;

a second transistor configured to couple the cathode terminal to a node of application of a reference voltage; and a microcontroller, comprising:

a digital-to-analog converter; and a comparator having a first input configured to receive a voltage at one of the anode and cathode terminals of the light-emitting diode and a second input configured to receive an output voltage of the digital-to-analog converter;

wherein a binary output signal of the comparator controls turning off of said one of the first and second transistors when current flow in the light-emitting diode exceeds maximum current limit.

2. The smart card according to claim 1, wherein the output voltage of the digital-to-analog converter is controlled by a digital input code selected such that the maximum current limit is below an exponential operating area of said light-emitting diode.

3. The smart card according to claim 1, wherein the output voltage of the digital-to-analog converter is controlled by a digital input code selected such that the maximum current limit does not exceed a linear operating area of said light-emitting diode.

4. The smart card according to claim 1, wherein the first input of the comparator receives the voltage at to the anode terminal of the light-emitting diode, and the binary output signal of the comparator controls turning off of said one of the first and second transistors when the voltage at the anode of the light-emitting diode is smaller than the output voltage of the digital-to-analog converter.

5. The smart card according to claim 1, wherein the first input of the comparator receives the voltage at the cathode terminal of the light-emitting diode, and the binary output signal of the comparator controls turning off of said one of the first and second transistors when the voltage at the cathode of the light-emitting diode is greater than the output voltage of the digital-to-analog converter.

6. The smart card according to claim 1, wherein the microcontroller is configured to apply a digital signal to control the other of said first and second transistors.

7. The smart card according to claim 6, wherein digital signal is asserted by the microcontroller to set the other of said first and second transistors to the on state during a phase of emission of light pulses by the light-emitting diode.

8. The smart card according to claim 1, further comprising a biometric sensor coupled to the microcontroller.

9. The smart card according to claim 8, wherein the biometric sensor is a fingerprint sensor.

10. A smart card, comprising:

a light-emitting diode having an anode terminal and a cathode terminal;

a first transistor configured to couple the anode terminal to a node of application of a power supply voltage;

a second transistor configured to couple the cathode terminal to a node of application of a reference voltage; and a microcontroller, comprising:

a digital-to-analog converter; and a comparator having a first input coupled to one of the anode and cathode terminals of the light-emitting diode and a second input configured to receive an output voltage of the digital-to-analog converter;

wherein an output signal of the comparator controls turning off of said one of the first and second transistors when current flow in the light-emitting diode exceeds maximum current limit and wherein said one of the first and second transistors provides a three-state output node of the microcontroller.

11. The smart card according to claim 10, wherein the output signal of the comparator controls the first transistor in order to pull said three-state output node to the voltage of the node of application of the power supply voltage.

12. The smart card according to claim 10, wherein the output signal of the comparator controls the second transistor in order to pull said three-state output node to the voltage of the node of application of the reference voltage.

13. The smart card according to claim 10, wherein the other of the first and second transistors provides a further three-state output node of the microcontroller.

14. The smart card according to claim 13, wherein the output signal of the comparator controls the first transistor in order to pull said three-state output node to the voltage of the node of application of the power supply voltage, and the second transistor is configured to pull said further three-state output node to the voltage of the node of application of the reference voltage.

15. The smart card according to claim 13, wherein the output signal of the comparator controls the second transistor in order to pull said three-state output node to the voltage of the node of application of the reference voltage, and the first transistor is configured to pull said further three-state output node to the voltage of the node of application of the power supply voltage.

16. The smart card according to claim 10, further comprising a biometric sensor coupled to the microcontroller.

17. The smart card according to claim 16, wherein the biometric sensor is a fingerprint sensor.

18. A circuit, comprising:

a light-emitting diode having an anode terminal and a cathode terminal;

a first transistor configured to couple the anode terminal to a node of application of a power supply voltage;

a second transistor configured to couple the cathode terminal to a node of application of a reference voltage; and a comparator having a first input configured to receive a voltage at one of the anode and cathode terminals of the light-emitting diode and a second input configured to receive a reference voltage corresponding to a maximum current limit for said light-emitting diode;

wherein a binary output signal of the comparator controls turning off of said one of the first and second transistors when current flow in the light-emitting diode exceeds said maximum current limit.

19. The circuit according to claim 18, wherein the maximum current limit is below an exponential operating area of said light-emitting diode.

20. The circuit according to claim 18, wherein the maximum current limit does not exceed a linear operating area of said light-emitting diode.

21. The circuit according to claim 18, wherein the first input of the comparator receives the voltage at the anode terminal of the light-emitting diode, and the binary output signal of the comparator controls turning off of said one of the first and second transistors when the voltage at the anode of the light-emitting diode is smaller than the reference voltage.

22. The circuit according to claim 18, wherein the first input of the comparator receives the voltage at the cathode terminal of the light-emitting diode, and the binary output signal of the comparator controls turning off of said one of the first and second transistors when the voltage at the cathode of the light-emitting diode is greater than the reference voltage.

23. The circuit according to claim 18, further comprising a control circuit configured to apply a digital signal to control the other of said first and second transistors.

24. The circuit according to claim 23, wherein digital signal is asserted by the control circuit to set the other of said first and second transistors to the on state during a phase of emission of light pulses by the light-emitting diode.

25. The circuit according to claim 18, wherein the light-emitting diode, first and second transistors and comparator are circuit components of a smart card.

26. The circuit according to claim 25, further comprising a biometric sensor for the smart card.

27. A circuit, comprising:
a light-emitting diode having an anode terminal and a cathode terminal;
a first transistor configured to couple the anode terminal to a node of application of a power supply voltage;
a second transistor configured to couple the cathode terminal to a node of application of a reference voltage; and
a sensing circuit having a sensing input coupled to one of the anode and cathode terminals of the light-emitting diode, said sensing circuit configured to detect from a voltage at said one of the anode and cathode terminals of the light-emitting diode a transition of operation of said light-emitting diode into an exponential operating area;
wherein an output signal of the sensing circuit controls turning off of said one of the first and second transistors when said transition of operation is detected.

28. The circuit according to claim 27, further comprising a control circuit is configured to apply a digital signal to control the other of said first and second transistors.

29. The circuit according to claim 28, wherein digital signal is asserted by the control circuit to set the other of said first and second transistors to the on state during a phase of emission of light pulses by the light-emitting diode.

30. A circuit, comprising:
a light-emitting diode having an anode terminal and a cathode terminal;
a first transistor configured to couple the anode terminal to a node of application of a power supply voltage;
a second transistor configured to couple the cathode terminal to a node of application of a reference voltage; and
a comparator having a first input coupled to one of the anode and cathode terminals of the light-emitting diode and a second input configured to receive a reference voltage corresponding to a maximum current limit for said light-emitting diode;
wherein an output signal of the comparator controls turning off of said one of the first and second transistors when current flow in the light-emitting diode exceeds said maximum current limit; and
wherein the maximum current limit is below an exponential operating area of said light-emitting diode.

31. The circuit according to claim 30, wherein the light-emitting diode, first and second transistors and comparator are circuit components of a smart card.

32. The circuit according to claim 31, further comprising a biometric sensor for the smart card.

33. A circuit, comprising:
a light-emitting diode having an anode terminal and a cathode terminal;
a first transistor configured to couple the anode terminal to a node of application of a power supply voltage;
a second transistor configured to couple the cathode terminal to a node of application of a reference voltage; and
a comparator having a first input coupled to one of the anode and cathode terminals of the light-emitting diode and a second input configured to receive a reference voltage corresponding to a maximum current limit for said light-emitting diode;
wherein an output signal of the comparator controls turning off of said one of the first and second transistors when current flow in the light-emitting diode exceeds said maximum current limit; and
wherein the maximum current limit does not exceed a linear operating area of said light-emitting diode.

34. The circuit according to claim 33, wherein the light-emitting diode, first and second transistors and comparator are circuit components of a smart card.

35. The circuit according to claim 34, further comprising a biometric sensor for the smart card.

* * * * *

UNITED STATES PATENT AND TRADEMARK OFFICE
CERTIFICATE OF CORRECTION

| | | |
|---|---|---|
| PATENT NO. | : 11,803,729 B2 | Page 1 of 1 |
| APPLICATION NO. | : 17/524094 | |
| DATED | : October 31, 2023 | |
| INVENTOR(S) | : Olivier Rouy | |

It is certified that error appears in the above-identified patent and that said Letters Patent is hereby corrected as shown below:

On the Title Page

Title and in the Specification, Column 1, Line 1, [[SMARTCARD]] should be -- SMART CARD --.

In the Claims

At Column 11, Line 26, Claim No. 4, [[voltage at to the anode]] should be corrected to read -- voltage at the anode --.

Signed and Sealed this
Fourth Day of March, 2025

Coke Morgan Stewart
*Acting Director of the United States Patent and Trademark Office*